United States Patent

[11] 3,599,182

[72] Inventor Robert A. Henle
Hyde Park, N.Y.
[21] Appl. No 791,306
[22] Filed Jan. 15, 1969
[45] Patented Aug. 10, 1971
[73] Assignee International Business Machines Corporation
Armonk, N.Y.

[54] MEANS FOR REDUCING POWER CONSUMPTION IN A MEMORY DEVICE
14 Claims, 3 Drawing Figs.

[52] U.S. Cl. .......... 340/173 R, 340/174 TB
[51] Int. Cl. .......... G11c 7/00, G11c 5/02
[50] Field of Search .......... 340/173, 174, 172.5, 166

[56] References Cited

UNITED STATES PATENTS

| | | | |
|---|---|---|---|
| 3,068,452 | 12/1962 | Sarrafian | 340/174 |
| 3,317,902 | 5/1967 | Michael | 340/172.5 |
| 3,358,274 | 12/1967 | Manor et al. | 340/174 |
| 3,394,358 | 7/1968 | Snyder | 340/174 |
| 3,487,383 | 12/1969 | Hatton et al. | 340/174 |

*Primary Examiner*—Stanley M. Urynowicz, Jr.
*Attorneys*—Hanifin and Jancin and Frank C. Leach, Jr.

ABSTRACT: The decoding means, which is utilized to select a storage cell or word in a memory device, is divided into a main decoder and at least a first group of decoders whereby only one of the first group of the decoders is activated when the main decoder is energized. Each of the decoders of the first group may be divided into a plurality of decoders that form a second group so that only one of the decoders of the second group also needs to be activated when the decoder of the first group is energized.

INVENTOR
ROBERT A. HENLE
BY Frank C. Leach Jr.
ATTORNEY

MEANS FOR REDUCING POWER CONSUMPTION IN A MEMORY DEVICE

In memory devices, particularly memory devices of the monolithic type, the reduction of power is desirable to reduce the heat dissipation problem in monolithic memories. This is because the small size of the chips on which the monolithic memories are formed does not provide sufficient area for dissipation of the heat.

In selecting a word, which comprises one or a plurality of storage cells and is defined by the conditions of such cells, an address means such as an address register for example, is connected to a decoder, which decodes the signal from the address means to determine which of the words is to be selected for reading or writing. The decoder must include sufficient circuitry to select a single word from a large number of words. For example, a decoder could be employed to select any one word of 4,096 words with only 12 input lines from the address means to the decoder. This will require a decoder to have a large number of circuits to make the single selection with only 12 input lines whereby a large amount of heat will be produced whenever the decoder is energized.

The present invention satisfactorily reduces the power level required by the decoding means through dividing the decoder into a plurality of decoders rather than a single decoder with each of the plurality of decoders having a much smaller amount of circuitry. Thus, the present invention contemplates employing a main decoder, which is connected to the address means, and at least a first group of decoders connected to the main decoder. Only one decoder of the first group of decoders would be activated by the main decoder at any particular time that the main decoder is energized. The selection of a specific word in such a decoder, which would be capable of selecting any one of 512 words if there were eight of the decoders in the first group and a total of 4,096 words in the memory, would be made through the connection of nine decoder lines, which extend between each of the decoders of 512 words and the address means.

Therefore, with only the main decoder, which is much smaller than the single decoder of presently available decoding means, and only one of the eight decoders of the first group being energized, a substantial reduction in the power consumption by the decoder is produced. Thus, a decrease in the heat of the chip having the memory means and the decoder thereon is produced.

Of course, more than one group of decoders may be employed. For example, each of the 512 word decoders could be divided into eight decoders of 64 words each. Thus, there would be a total of 64 decoders of the 64-word type.

In this arrangement, the 512 word decoders would have only three lines connected to the address means whereby one of the eight 64 word decoders connected to the energized 512 word decoder would be activated. Then, six additional lines would be connected between the addressing means and each of the 64 word decoders to select the final word in the activated 64 word decoder.

Therefore, in this arrangement, even a smaller amount of power would be utilized since each of the 512 word decoders would not require as much circuitry as when the 512 word decoders make the final selection. Since only one of the 64 word decoders would be energized, a substantial saving in the power consumption of the decoding means is produced.

An object of this invention is to provide a memory device having a reduced power consumption.

Another object of this invention is to provide a memory device in which the decoding means is subdivided to reduce the power requirement of the decoding means.

A further object of this invention is to provide selective powering of decoding means for a memory device.

The foregoing and other objects, features, and advantages of the invention will be more apparent from the following more particular description of the preferred embodiments of the invention as illustrated in the accompanying drawings.

Figure 1:
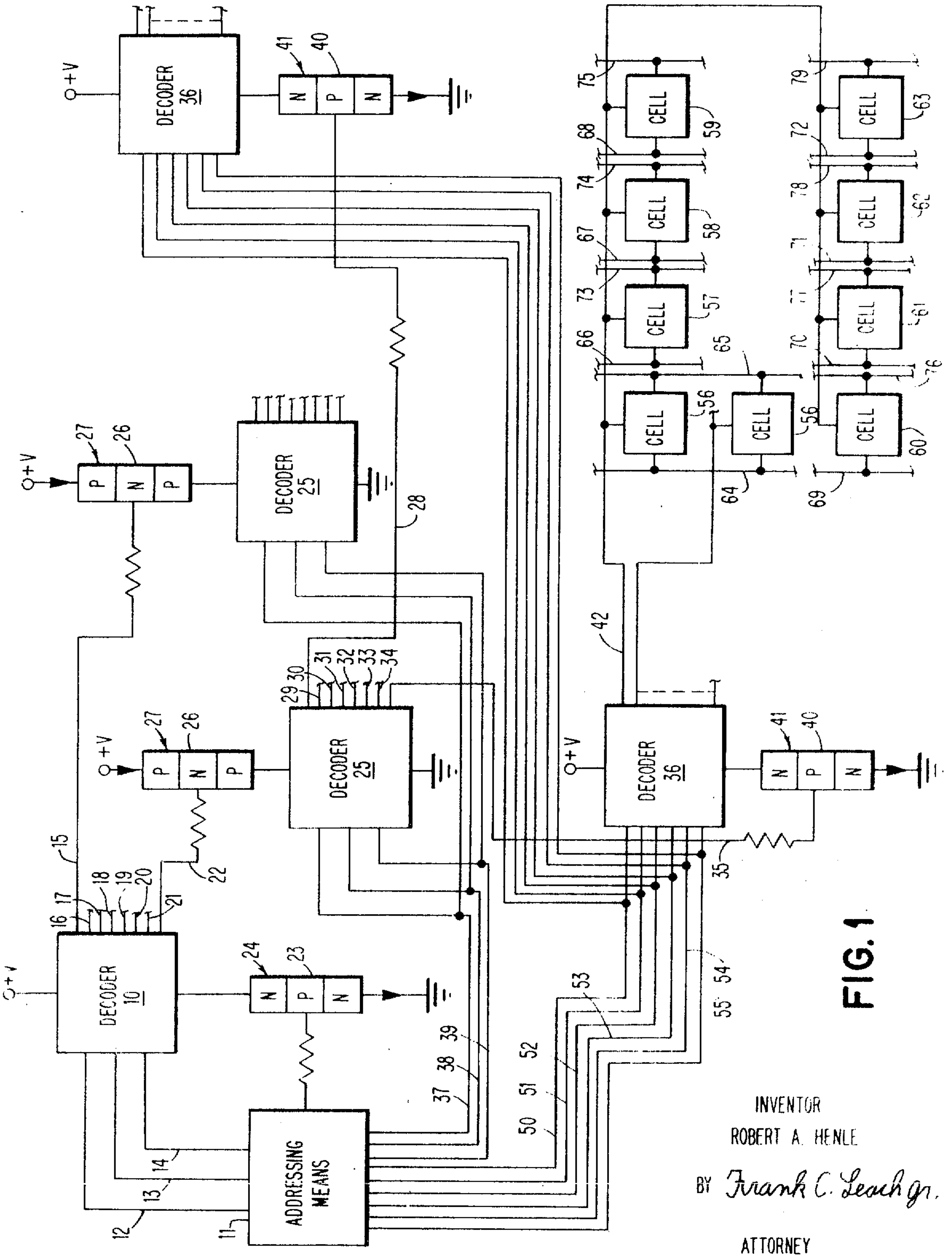
FIG. 1 is a schematic circuit diagram showing an apparatus for reducing the power of a decoding means for a memory device including one form of switching device.

Referring to the drawings and particularly FIG. 1, there is shown a decoding apparatus of the present invention for use with a memory means. The decoding apparatus includes a main decoder 10, which is connected to an addressing means 11 such as an address register, for example, by lines 12—14. The main decoder 10 has eight lines 15—22 extending therefrom. Whenever the decoder 10 is energized and a signal is supplied from the addressing means 11 by means of the lines 12—14, one of the lines 15—22 supplies an output from the decoder 10.

The decoder 10 can be energized only when the addressing means 11 is supplying an output to base 23 of an NPN transistor 24, which has its collector connected to the decoder 10. When the transistor 24 is saturated, voltage from a power supply, +V, is supplied through the decoder 10 to allow signals on the lines 12—14 to be effective as inputs to the decoder 10 to cause an output to appear on one of the lines 15—22.

Therefore, when the decoder 10 has power supplied thereto by means of the power supply, +V, only one of the lines 15—22 is energized. Since each of the lines 15—22 is connected to control the energization of a different one of decoders 25 of a first group of eight decoders, only one of the eight decoders 25 of the first group will be energized. Thus, if the memory means includes 4,096 words, each of the decoders 25 of the group connected to the decoder 10 can select a group of 512 words.

Therefore, when an output signal appears on one of the lines 15—22 of the main decoder 10, only one of the 512 word decoders 25 is energized. The energization of the decoder 25 occurs by the output of one of the lines 15—22 being supplied to a base 26 of a PNP transistor 27. The PNP transistor 27 has its emitter connected to the power supply, +V, and its collector connected to the decoder 25, which also is connected to ground.

When one of the lines 15—22 has an output thereon that will turn on one of the decoders 25, this output is at ground since the transistor 24 is saturated. As a result, this reduction in the signal on the line 15—22 allows the transistor 27 to be saturated. When the transistor 27 is saturated, the decoder 25 supplies an output through one of its eight output lines 28—35 to control one of a second group of eight 64 word decoders 36. Each of the decoders 25 is connected by three lines 37—39 to the addressing means 11.

Therefore, when the decoder 25 is energized, the addressing means 11 supplies a signal by means of the lines 37—39 to the decoder 25 to cause one of the lines 28—35 to have an output signal thereon. The output signal on the lines 28—35 will be substantially the voltage of the power supply, +V, which is being supplied to the decoder 25 through the transistor 27 since the transistor 27 is saturated.

When there is an output signal from the decoder 25 on one of the lines 28—35, it supplies a signal to a base 40 of an NPN transistor 41 to cause the NPN transistor 41 to saturate. Thus, with the transistor 41 saturated, current from the power supply, +V, flows through the decoder 36 to produce an output on one of 64 lines (two shown at 42 and 43) of the decoder 36, which has been energized. It will be assumed that the decoder 36, which has its transistor 41 connected to the line 35 of the decoder 25, is the one that is energized. The output signal, which appears on one of the 64 lines (two shown at 42 and 43) is ground when the transistor 41 is saturated.

Each of the eight decoders 36 of each of the second groups for each of the eight decoders 25 of the first group is connected to the addressing means 11 by six lines 50—55. The signal from the addressing means 11 is supplied by the lines 50—55 to all of the decoders 36. However, only the decoder 36, which has been activated by a signal from the energized decoder 25, is capable of supplying an output signal on one of the 64 output lines (two shown at 42 and 43.)

Thus, when a signal appears on one of the 64 output lines (two shown at 42 and 43) of one of the decoders 36 of the second group of decoders connected to the energized decoder 25, a single word has been selected. Each of the 64 output lines (two shown at 42 and 43) of each of the decoders 36 is connected to eight cells 56—63 since eight bits are considered to comprise a word. Of course, the number of storage cells may vary depending on the number of bits forming a word. When an output signal appears on the line 42, each of the cells 56—63 of the memory device receives the output signal on the line 42.

Each of the cells 56 of each of the 64 lines (two shown at 42 and 43) is connected to a zero bit line 64 and a one bit line 65. The other cells 57—63 of each of the 64 lines (two shown at 42 and 43) are connected to zero bit lines 66—72, respectively. Likewise, each of the cells 57—63 for each of the 64 lines (two shown at 42 and 43) of each of the decoders 36 is connected to one bit lines 73—79, respectively. A signal is supplied on one of the bit lines when writing is desired and a signal on the bit lines is sensed when reading is desired.

Accordingly, when the line 42 has an output signal thereon, either reading of the word defined by the cells 56—63 of the line 42 or writing of a new word in the cells 56—63 will occur. If reading is desired, it is only necessary to use a sense amplifier, for example, connected to each pair of the bit lines for each cell to ascertain the signals defining the word, which is stored by the cells 56—63.

If a new word is to be written in the storage cells 56—63 of the line 42, the line 42 must have an output signal thereon and one of the zero and one bit lines for each of the cells must have a signal thereon. Thus, the storage cells 56—63 may have a new word written therein.

It should be understood that a switch is necessary to determine whether the lines are employed for read or write. The switch would be actuated in accordance with whether reading or writing is to occur.

Considering the operation of the apparatus of FIG. 1, reading or writing can occur only when the addressing means 11 is supplying a signal to cause the transistor 24 to be saturated so that the main decoder 10 is supplying an output signal to one of the decoders 25 of the first group and the decoder 25, which is receiving the signal from the decoder 10, is supplying a signal to one of the decoders 36 of the second group that is connected to the activated decoder 25. Therefore, when the addressing means 11 is supplying signals to the decoders 10, 25, and 36, the decoder 36, which is receiving a signal from the energized decoder 25, produces an output signal on one of the 64 lines (two shown at 42 and 43) depending on the input signal from the addressing means 11 through the lines 50—55. This results in one of the 64 lines (two shown at 42 and 43) having an output signal thereon whereby the storage cells 56—63 of that particular output line are energized.

At the same time, either reading or writing occurs as determined by the computer program. If writing is to occur, one of the zero and one bit lines of each cell is connected to a signal to write the desired word in the cells 56—63. All of the other cells 56—63 of the other 63 lines (one shown at 43) are connected to the same bit lines as the cells 56—63 of the line 42, but none of these cells will be affected by the output of the decoder 36 since the other 63 lines do not have an output thereon.

When reading is to occur, each pair of the bit lines may be connected to a separate sense amplifier, for example. Only the cells 56—63 of the output line 42 will supply any signal on the bit lines. The cells 56—63 of the other 63 lines will not be supplying any signal to the bit lines because they will not be receiving a signal from the decoder 36 to energize them.

Accordingly, only a single word is read or written in accordance with the word that is to be read or written as determined by the addressing means 11. However, because the decode 10, the selected decoder 25, and the selected decoder 36 have much less energized circuitry then the energized circuitry of a single decoder utilized to select a single word from 4,096 words, for example, the power dissipation produced by the apparatus of the present invention is substantially reduced. Thus, the heat problem when utilizing the decoding means of the present invention on a single chip of a monolithic integrated semiconductor array is substantially reduced.

Figure 2:
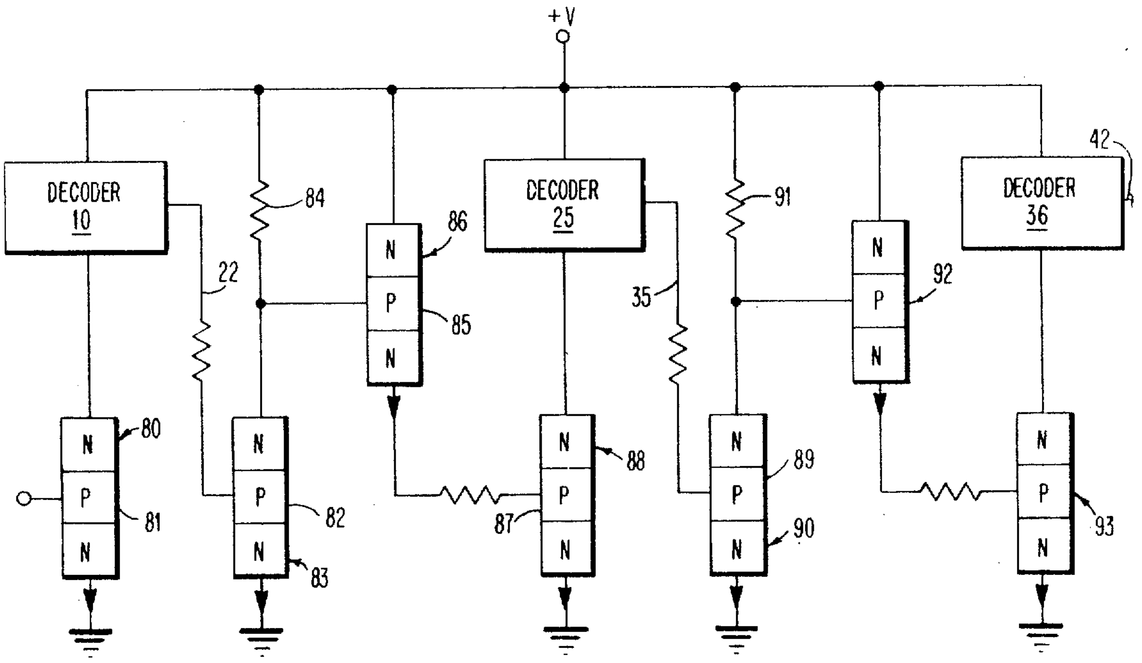
FIG. 2 is a schematic circuit diagram of another switching device for utilization with the decoding means of the present invention.

Instead of utilizing the complementary switching arrangement of FIG. 1, the buffer stage switching arrangement of FIG. 2, which is a noncomplementary arrangement, can be employed. Referring to FIG. 2, there is shown the decoder 10, the decoder 25 of the first group that is to be selected in the same manner as it was selected in the embodiment of FIG. 1, and the decoder 36 of the second group that is selected as in the embodiment of FIG. 1. Each of the decoders 10, 25, and 36 is directly connected to the single power supply, +V.

The decoder 10 also is connected to a collector of an NPN transistor 80, which has its emitter grounded. The transistor 80 has its base 81 connected to the addressing means 11. The addressing means 11 and its output lines have been omitted from this view since they are the same as in FIG. 1.

Accordingly, whenever the addressing means 11 supplies a positive signal to the base 81 of the transistor 80, the output signal on the line 22 of the decoder 10 drops from the voltage of the power supply, +V, to ground in the same manner as described in FIG. 1. Since the line 22 (It should be understood that there are eight output lines 15—22 as in FIG. 1 but only the active line has been shown) is connected to base 82 of an NPN transistor 83, which has its emitter grounded and its collector connected through a resistor 84 to the power supply, +V, the transistor 83 will be turned off when the transistor 81 is saturated.

When the transistor 83 is turned off, current no longer flows through the resistor 84 to cause a voltage drop. Thus, base 85 of an NPN transistor 86, which has its collector connected to the power supply, +V, and its emitter connected to base 87 of an NPN transistor 88, receives an increased signal to cause the transistor 86 to be saturated. As a result of the transistor 86 being saturated, sufficient current flows to the base 87 of the transistor 88 to saturate the transistor 88.

When the transistor 88 is saturated, the decoder 25 is activated so that the output on the line 35 decreases from the voltage of the power supply, +V, to ground. It should be understood that the line 35 is selected in the same manner as described for the embodiment of FIG. 1. Thus, the decoder 25 is connected to the addressing means 11 by the lines 37—39 in the same manner as described for FIG. 1. As previously mentioned, these have not been shown in FIG. 2.

Since the line 35 is connected to base 89 of an NPN transistor 90, which has its emitter grounded and its collector connected through a resistor 91 to the power supply, +V; the transistor 90 is turned off when the transistor 88 is turned on. As a result of turning off the transistor 90, the transistors 92 and 93 are saturated in the same manner as the transistors 86 and 88 were saturated when the transistor 83 was turned off.

When the transistor 93 saturates, the output on the line 42 drops from the voltage of the power supply, +V, to ground to produce the selection of the cells 56—63 in the same manner as described for FIG. 1. Thus, reading of the word, which is defined by the cells 56—63 connected to the line 42, or writing of a new word in the cells 56—63 of the line 42 may now occur.

It should be understood that each of the other seven decoders 25, which have not been selected, is connected to one of the output lines 15—21 in the same manner as the energized decoder 25 is connected to the line 22. Thus, each of the other decoders 25 would be energized when the signal on its connected line to the decoder 10 drops. Of course, only one of the decoders 25 is energized when the decoder 10 is energized.

It also should be understood that each of the other seven decoders 36 of the energized decoder 25 is connected to one of the lines 28—34 in the same manner as the energized decoder 36 is connected to the line 15. Thus, each of the other decoders 36 would be energized when the signal on its connected line to the energized decoder 25 drops. Of course, only one of the eight decoders 36 of the energized decoder 25 is energized when the decoder 25 is energized. This also is applicable to each of the other groups of the decoders 36 connected to the other seven of the decoders 25 when one of the other seven of the decoders 25 is energized.

Figure 3:
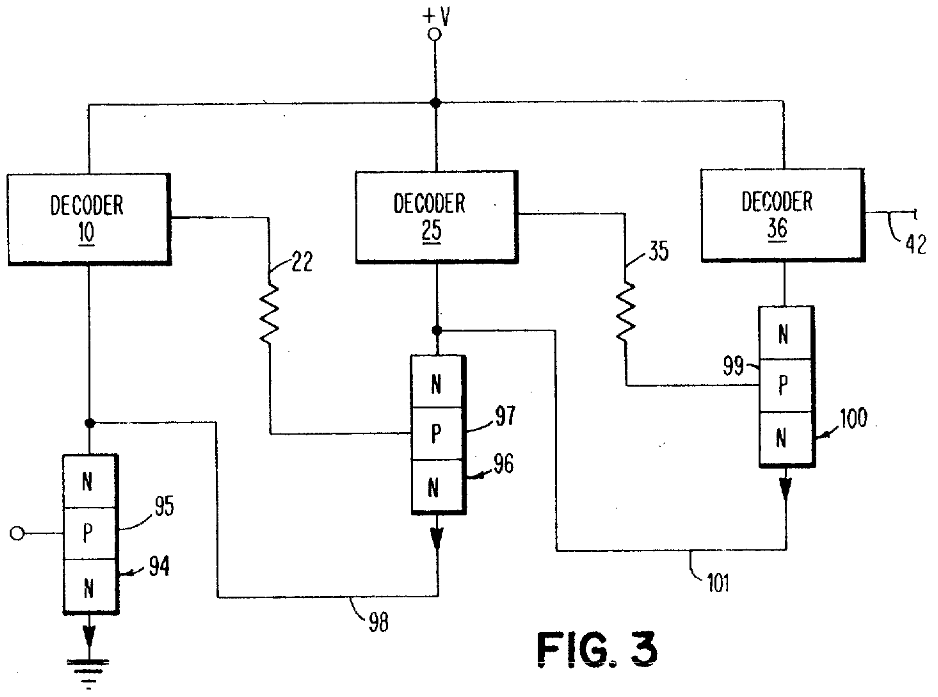
FIG. 3 is a schematic circuit diagram of another switching device for use with the decoding means of the present invention.

Referring to FIG. 3, there is shown a series power switching arrangement for selecting the particular word through selecting the decoder 25 of the first group after the decoder 10 has been energized and then energizing one of the decoders 36 of the energized decoder 25. Thus, the series power switching arrangement of FIG. 3 is employed to produce an output signal on one of the 64 lines of the energized decoder 36.

Each of the decoder 10, the decoders 25 of the first group, and the decoders 36 of each of the second groups is connected to the power supply, +V. As long as an NPN transistor 94, which has its collector connected to the decoder 10, is turned off, there can be no energization of any of the decoders 25 and 36. Thus, there is no signal from any of the decoders 36 to the cells 56—63.

The transistor 94 has its base 95 connected to the addressing means 11 for energization thereof whenever one of the 4,096 words, which is controlled by the decoding apparatus, is to be selected. When the selection of a word for reading or writing is to occur, the addressing means 11 supplies a signal to the base 95 of the transistor 94 to cause it to be saturated. The addressing means 11 and its output lines have been omitted from this view since they are the same as in FIG. 1.

This produces an output on the line 22 by dropping the voltage thereon from the voltage of the power source, +V. However, because an NPN transistor 96 has its base 97 connected to the line 22 while its emitter is connected by a line 98 to the collector of the transistor 94, there is sufficient current flow between the base and the emitter of transistor 96 to cause it to be saturated. Thus, when the line 22 has an output signal thereon due to a signal from the addressing means 11 to the decoder 10 in the manner shown in FIG. 1, one of the decoders 25 of the first group of eight decoders is activated.

When the transistor 96 is saturated, an output signal appears on the line 35 of the decoder 36 in the same manner as previously described for the embodiment of FIG. 1. This signal from the line 35 is applied to a base 99 of an NPN transistor 100, which has its collector connected to one of the decoders 36 of the group of eight decoders connected by the lines 28—35 to the decoder 25, which has been energized.

The transistor 100 has its emitter connected by a line 101 to the collector of the transistor 96. Therefore, when an output signal appears on the line 35, the transistor 100, which has its base 99 connected to the line 35, is saturated due to the current flow between its base and emitter.

Saturation of the transistor 100 results in the decoder 36 being energized. When the decoder 36 is energized, one of the 64 lines has an output signal thereon to cause the storage cells 56—63, which are connected to that particular line, to either be read or have a new word written therein. The line 42 is deemed to be the line having the output signal thereon in the same manner as described for the arrangement of FIG. 1.

It should be understood that each of the other seven decoders 25, which have not been selected, is connected to one of the output lines 15—21 and to the collector of the transistor 94 by an NPN transistor similar to the transistor 96 in the same manner as the energized decoder 25 is connected to the line 22 and to the collector of the transistor 94 by the transistor 96. Thus, each of the other decoders 25 would be energized when current flows through its connected line from the decoder 10. Of course, only one of the decoders 25 is energized when the decoder 10 is energized.

It is also understood that each of the other seven decoders 36 of the energized decoder 25 is connected to one of the lines 28—34 and to the collector of the transistor 96 by an NPN transistor similar to the transistor 100 in the same manner as the energized decoder 36 is connected to the line 35 and to the collector of the transistor 96 by the transistor 100. Thus, each of the other decoders 36 of the energized decoder 25 would be energized when current flows through its connected line from the decoder 25. Of course, only one of the eight decoders 36 of the energized decoder 25 is energized when the decoder 25 is energized. This also is applicable to each of the other groups of the decoders 36 connected to the other seven of the decoders 25 when one of the other seven of the decoders 25 is energized.

It should be understood that the number of output lines from each of the decoders 10, 25, and 36 may vary. Thus, the present number of output lines is merely for illustration.

While the foregoing decoder arrangements have been described for utilization with a monolithic memory, it should be understood that the present invention has utility with any type of memory means such as a magnetic memory, for example, to reduce it power consumption. The same arrangement of the decoder means would be employed as for the monolithic memory.

While two groups of decoding means have been shown in addition to the decoder 10, it should be understood that only the decoders 25 of the first group could be employed. In such an arrangement, it would be necessary to connect the lines 50—55 to each of the decoders 25 and to have 512 lines extending from each of the eight decoders 25 rather than eight lines. Each of these lines would be connected to one of the groups of the cells 56—63.

If it should be desired to control a larger or smaller word memory than 4,096 words by a single decoding means, this may be accomplished with the present invention. Thus, any arrangement may be utilized for the decoding means whereby the decoding means is divided into various segments with each segment having only one decoder energized for selecting a particular word.

An advantage of this invention is that it reduces the power supplied to the decoding means. Another advantage of this invention is that it decreases the heat problems in monolithic memories.

While the invention has been particularly shown and described with reference to preferred embodiments thereof, it will be understood by those skilled in the art that the foregoing and other changes in form and details may be made therein without departing from the spirit and scope of the invention.

What I claim is:

1. A memory device having:
a plurality of memory means;
addressing means;
decoding means to provide a signal to one of said memory means for reading the information stored in said one memory means or writing information into said one memory means;
said decoding means including:
a main decoder connected to said addressing means;
a first group of decoders;
first means connecting each of said decoders of said first group to said main decoder;
and second means connecting each of said decoders of said first group to said addressing means independently of the connection of said main decoder to said addressing means;
and means to power only one of said decoders of said first group when said main decoder is powered in response to a signal from said addressing means, said power means being separate from said second connecting means.

2. The memory device according to claim 1 in which said power means includes means to control powering of said main decoder in response to a signal from said addressing means.

3. The memory device according to claim 1 in which said memory means comprises storage cells of a monolithic integrated semiconductor array.

4. The memory device according to claim 1 in which:

said power means includes a power source;

and said first connecting means includes means to control the supply of power from said power source to each of said decoders of said first group to cause only one of said decoders of said first group to be powered in response to a signal from said main decoder when said main decoder is powered.

5. The memory device according to claim 4 in which said control means comprises complementary switching means.

6. The memory device according to claim 4 in which said control means comprises buffer stage switching means.

7. The memory device according to claim 4 in which said control means comprises series power switching means.

8. A memory device having:

a plurality of memory means;

addressing means;

decoding means to provide a signal to one of said memory means for reading the information stored in said one memory means or writing information into said one memory means;

said decoding means including:

a main decoder connected to said addressing means;

and a first group of decoders, each of said decoders of said first group being connected to said main decoder and to said addressing means;

each of said decoders of said first group has a second group of decoders connected thereto;

each of said second group of decoders has the same number of decoders therein, each of said decoders of said second groups of decoders is connected to said addressing means;

means to power only one of said decoders of said first group when said main decoder is powered in response to a signal from said addressing means;

and said power means including means to power only one of said decoders of said second group of decoders connected to said one decoder of said first group when said one decoder of said first group is powered by said power means.

9. The memory device according to claim 8 in which said power means includes means to control powering of said main decoder in response to a signal from said addressing means.

10. The memory device according to claim 8 in which:

said power means includes a power source;

and means to control the supply of power from said power source to each of said decoders of said first group and to each of said decoders of each of said second groups.

11. The memory device according to claim 10 in which said control means comprises complementary switching means.

12. The memory device according to claim 10 in which said control means comprises buffer stage switching means.

13. The memory device according to claim 10 in which said control means comprises series power switching means.

14. A memory device having:

a plurality of memory means;

addressing means;

decoding means to provide a signal to one of said memory means for reading the information stored in said one memory means or writing information into said one memory means;

said decoding means including:

a main decoder connected to said addressing means;

and a first group of decoders, each of said decoders of said first group being connected to said main decoder and to said addressing means;

first means to supply a first signal to said main decoder from said addressing means;

second means, separate from said first supply means, to supply a second signal to each of said decoders of said first group from said addressing means when said first supply means supplies the first signal to said main decoder from said addressing means;

means to power only one of said decoders of said first group when said main decoder is powered in response to a signal from said addressing means;

and third means, separate from said first and second supply means, to supply a third signal from said main decoder in accordance with the first signal supplied to said main decoder from said addressing means by said first supply means to cause powering of only one of said decoders of said first group by said power means when said second supply means is supplying the second signal to each of said decoders of said first group.